United States Patent [19]
Oliver

[11] Patent Number: 5,658,685
[45] Date of Patent: Aug. 19, 1997

[54] BLENDED POLYMER GEL ELECTROLYTES

[75] Inventor: Manuel Oliver, Norcross, Ga.

[73] Assignee: Motorola, Inc., Schaumburg, Ill.

[21] Appl. No.: 518,732

[22] Filed: Aug. 24, 1995

[51] Int. Cl.$^6$ .................................................. H01M 6/18
[52] U.S. Cl. .......................... 429/190; 429/192; 429/194; 429/218; 252/622
[58] Field of Search .............................. 429/192, 194, 429/190, 218; 252/62.2

[56] References Cited

U.S. PATENT DOCUMENTS

| | | | |
|---|---|---|---|
| 5,016,991 | 5/1991 | Mason | 350/357 |
| 5,176,969 | 1/1993 | Miyabayashi et al. | 429/212 |
| 5,296,318 | 3/1994 | Gozdz et al. | 429/192 |
| 5,385,679 | 1/1995 | Uy et al. | 252/500 |
| 5,429,890 | 7/1995 | Pynenburg et al. | 429/192 |
| 5,437,943 | 8/1995 | Fujii et al. | 429/192 |
| 5,460,903 | 10/1995 | St. Aukyn Hubbard et al. | 429/190 |

OTHER PUBLICATIONS 0 167–2738/86 1987 (month n/a) Solid State Ionics 18 & 19 (North Holland, Amsterdam, pp. 282–286.
0032–3861/91/183 422–04 1991 (month n/a) Polymer, 1991, vol. 32, No. 18, pp. 3422–3425.
Abstract No. 117, Oct. 1994 Extended Abstracts Oct 1994 ECS Mtg. pp. 184–185.

Kynar® Polyvinylidene Fluoride Catalog (n/a).

Kynar Flex® Fluoropolymer Resin Catalog (n/a).

Kynar® and Kynar Flex® Technical Brochure (n/a).

*Primary Examiner*—M. Nuzzolillo
*Attorney, Agent, or Firm*—Kenneth M. Massaroni

[57] ABSTRACT

An electrolyte system 40 for use in connection with an electrochemical cell 10. The cell 10 includes a positive electrode 20 and a negative electrode 30 with the electrolyte system 40 disposed therebetween. The electrolyte system is a blended polymer gel electrolyte system including a liquid electrolyte species which may be either aqueous or non-aqueous and a blended polymer gel electrolyte support structure. The blended polymer gel electrolyte support structure includes at least a first phase adapted to absorb or otherwise engage the electrolyte active species and a second phase which is substantially inert and does not absorb the electrolyte active species. The second phase may be divided to reduce swelling of the gel electrolyte in the presence of the electrolyte active species, and further to enhance mechanical integrity of the support structure.

19 Claims, 4 Drawing Sheets

BLENDED POLYMER GEL ELECTROLYTES

TECHNICAL FIELD

This invention relates in general to the field of electrolytes for electrochemical cells, and more particularly to polymer electrolytes for such cells.

BACKGROUND OF THE INVENTION

There has been a great deal of interest in developing better and more efficient methods for storing energy for applications such as radio communication, satellites, portable computers, and electric vehicles to name but a few. Accordingly, there have been recent concerted efforts to develop high energy, cost effective batteries having improved performance characteristics.

Rechargeable, or secondary cells are more desirable than primary (non-rechargeable) cells since the associated chemical reactions which take place at the positive and negative electrodes of the battery are reversible. Electrodes for secondary cells are capable of being regenerated (i.e. recharged) many times by the application of an electrical charge thereto. Numerous advanced electrode systems have been developed for storing electrical charge. Concurrently, much effort has been dedicated to the development of electrolytes capable of enhancing the capabilities of electrochemical cells.

Heretofore, electrolytes have been either liquid electrolytes as are found in conventional wet cell batteries, or solid films as are available in newer, more advanced battery systems. Each of these systems have inherent limitations, and related deficiencies which make them unsuitable for various applications.

Liquid electrolytes, while demonstrating acceptable ionic conductivity, tend to leak out of the cells into which they are sealed. While better manufacturing techniques have lessened the occurrence of leakage, cells still do leak potentially dangerous liquid electrolytes from time to time. This is particularly true of current lithium ion cells. Moreover, any leakage in the cell lessens the amount of electrolyte available in the cell, thus reducing the effectiveness of the cell. Cells using liquid electrolytes are also not available for all sizes and shapes of batteries.

Conversely, solid electrolytes are free from problems of leakage. However, they have vastly inferior properties as compared to liquid electrolytes. For example, conventional solid electrolytes have ionic conductivities in the range of $10^{-5}$ S/cm (Siemens per centimeter). Whereas acceptable ionic conductivity is $>10^{-3}$ S/cm. Good ionic conductivity is necessary to ensure a battery system capable of delivering usable amounts of power for a given application. Good conductivity is necessary for the high rate operation demanded by, for example, cellular telephones and satellites. Accordingly, solid electrolytes are not adequate for many high performance battery systems.

While solid electrolytes are intended to replace the combination of liquid electrolytes and separators used in conventional batteries, the limitations described hereinabove have prevented them from being fully implemented. One class of solid electrolytes, specifically gel electrolytes, have shown some promise. Gel electrolytes contain a significant fraction of solvents (or plasticizers) in addition to the salt and polymer of the electrolyte itself. One processing route that can be used to assemble a battery with a gel electrolyte is to leave out the solvent until after the cell is fabricated. The cell may then be immersed in the solvent and a gel is formed as the solvent is absorbed. Two problems, however, may arise during solvent absorption: (1) the gel electrolyte may lack sufficient mechanical integrity to prevent shorting between the electrodes; and/or (2) excessive swelling accompanies the gel formation. Each of these problems is a significant limitation to the successful implementation of gel electrolytes in electrochemical cells.

Accordingly, there exists a need for a new electrolyte system which combines the properties of good mechanical integrity, as well as the ability to absorb sufficient amounts of liquid electrolytes so as to produce an electrolyte with the high ionic conductivity of liquid electrolytes. The electrolytes so formed should also avoid excessive swelling, and all the problems associated therewith.

The file of this patent contains at least one drawing executed in color. Copies of this patent with color drawing (s) will be provided by the Patent and Trademark Office upon request and payment of the necessary fee.

DETAILED DESCRIPTION OF THE PREFERRED EMBODIMENT

Figure 1:
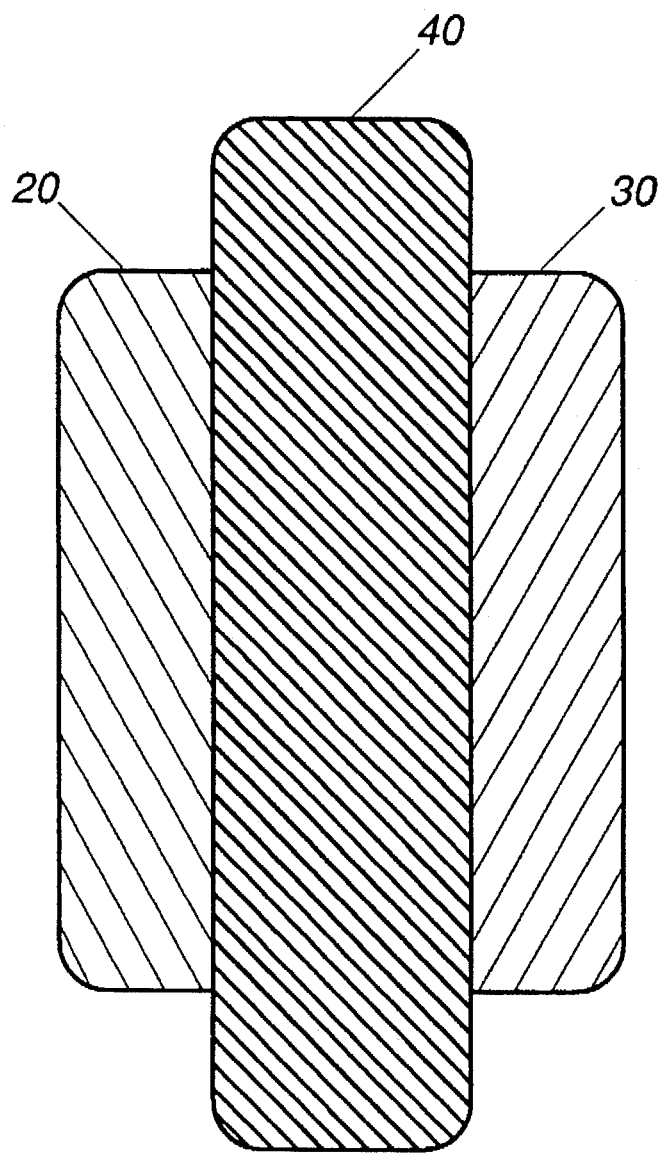
FIG. 1 is a schematic representation of an electrochemical cell in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a schematic representation of an electrochemical cell in accordance with the instant invention. The cell 10 includes a positive electrode 20 and a negative electrode 30. The positive electrode 20 may be fabricated of any of a number of chemical systems known to those of ordinary skill in the art. Examples of such systems include manganese oxide, nickel oxide, cobalt oxide, vanadium oxide, and combinations thereof. The negative electrode 30 may likewise be fabricated from any of a number of electrode materials known to those of ordinary skill in the art. Selection of the negative electrode material is dependent on the selection of the positive electrode so as to assure an electrochemical cell which will function properly for a given application. In this context, the negative electrode may be fabricated from alkali metals, alkali metal alloys, carbon, graphite, petroleum coke, and combinations thereof. The types of negative and positive electrode materials recited above are typically associated with lithium battery cells. It is to be noted however that the invention is not so limited; the blended polymer electrolyte system of the instant invention may be advantageously employed with nickel-cadmium, nickel-metal hydride, lead-acid, or any other battery system.

Operatively disposed between the positive 20 and negative 30 electrodes is an electrolyte system 40. The electrolyte system 40 comprises a polymer blend including at least two polymers adapted to function as a support structure and an electrolyte active species. The electrolyte active species may be either a liquid or solid, and may further include a plasticizer or solvent. Preferably, the electrolyte active species is a liquid electrolyte adapted to promote ion transport between the positive and negative electrodes, which liquid is absorbed into the blended polymer support structure.

As noted above, in the fabrication of polymer gel electrolytes, two problems arise during solvent absorption. The first problem relates to the lack of sufficient mechanical integrity to prevent electrical shorting between the electrodes and the second problem relates to excessive swelling which often accompanies the gel formation as the polymer is being immersed in the liquid electrolyte species. The instant polymer blend electrolyte system solves these problems by providing a polymer blend, such as a two phase polymer blend, in which at least one polymer is provided for purposes of absorbing the electrolyte active species, while at least a second polymer, which either does not absorb electrolytes or at best absorbs very little electrolyte, provides mechanical integrity. As the mechanical integrity is improved, shorting between the electrodes is reduced or eliminated.

In addition to improving the mechanical integrity of the electrolyte, the second polymeric phase reduces the rate of electrolyte absorption. By slowing the rate of absorption, excessive swelling can be avoided and hence the problems encountered in the prior art devices. It is to be understood that while the system is described above refers to two phases, the invention is not so limited. Indeed, the polymer blend electrolyte system may be a multiphase system in which one or more phases contribute to electrolyte active species absorption, and one or more phases contributes to improved mechanical integrity. The operative distinction however is the presence of discrete phases in a polymer blend, as opposed to the co-polymers common in other polymeric electrolyte systems.

The liquid electrolyte absorbed by the support structure is selected to optimize performance of the positive 20 and negative 30 electrode couple. Thus, for lithium type cells the liquid electrolyte absorbed by the support structure is typically a solution of an alkali metal salt, or combination of salts, dissolved in a non-protonic organic solvent or solvents. Typical alkali metal salts include, but are not limited to, salts having the formula $M^+X^-$ where $M^+$ is an alkali metal cation such as $Li^+$, $Na^+$, $K^+$ and combinations thereof; and $X^-$ is an anion such as $Cl^-$, $Br^-$, $I^-$, $ClO_4^-$, $BF_4^-$, $PF_6^-$, $AsF_6^-$, $SbF_6^-$, $CH_3CO_2^-$, $CF_3SO_3^-$, $(CF_3O_2)_2N^-(CF_3SO_2)_2N^-$, $(CF_3SO_2)_3C^-$, and combinations thereof. Non-protonic organic solvents include, but are not limited to, propylene carbonate, ethylene carbonate, diethyl carbonate, dimethyl carbonate, dipropyl carbonate, dimethyl sulfoxide, acetonitrile, dimethoxyethane, diethoxyethane, tetrahydrofuran, and combinations thereof. For other electrode combinations, other electrolyte active species are preferred, such as KOH, may be employed.

Figure 2:
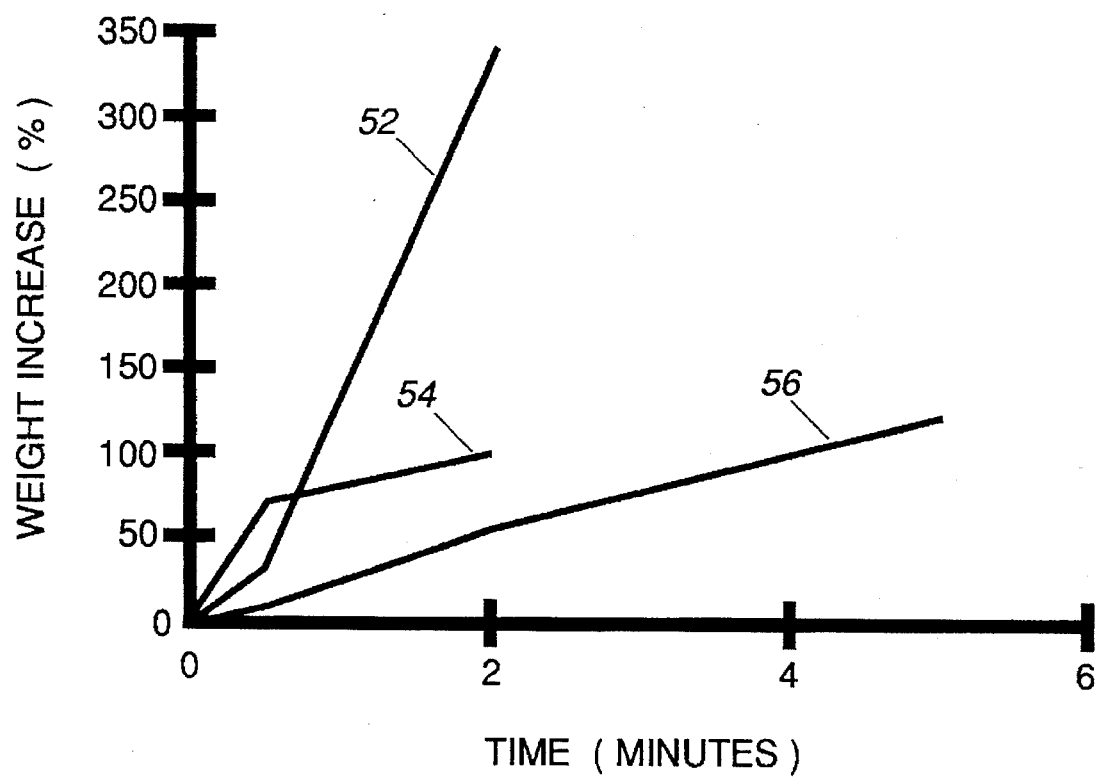
FIG. 2 is a chart illustrating the weight increase in percent for various polymer and polymer blend materials as a function of time.

Referring now to FIG. 2, there is illustrated therein a chart describing the weight increase in percent of various polymer gel electrolyte materials versus time. This chart specifically illustrates the differences found for common homopolymers and copolymers versus polymer blends according to the instant invention. Accordingly, as is shown by line 52, a low crystallinity polyvinylidene fluoride (PVDF) homopolymer known as KYNAR®461 (Kynar is a registered trademark of Elf Atochem North America, Inc.) demonstrated extremely high increases in weight with the absorption of liquid electrolytes in a relatively short period of time. Electrolyte absorption is so high as to cause the resulting gel to expand into the electrodes. This expansion lowers conductivity between the electrodes thereby seriously degrading the electrochemical performance of cells into which the electrolyte is incorporated. Line 54 illustrates the absorption properties of a PVDF/polytetrafluoroethylene copolymer (PTFE) known as KYNAR®7201. It may be appreciated from a perusal of FIG. 2, line 54, that lower electrolyte absorption was demonstrated by the PVDF/PTFE copolymer. This lower absorption substantially reduced the problems associated with gel expansion as experienced by the PVDF homopolymer. However, cells constructed from this copolymer experienced short circuiting between the electrodes due to poor mechanical strength of the gel electrolyte.

A polymer blend, as opposed to a copolymer, was prepared using a combination of KYNAR®461 and 18% high density polyethylene (HDPE). The polymer blend so synthesized displayed good mechanical strength and did not absorb excessive electrolyte as maybe appreciated from line 56 of FIG. 2. Electrochemical cells constructed using this polymer blend did not experience shorting during the assembly, and yielded excellent electrochemical performance. It is to be noted that the three examples described in FIG. 2 employed a liquid electrolyte consisting of 1M $LiPF_6$ including a solvent or plasticizer consisting of a 50% propylene carbonate, and 50% ethylene carbonate.

While FIG. 2 illustrates the use of a polyvinylidene fluoride-HDPE polymer blend, it is contemplated that the concept of using a polymer blend could easily be extended to other gel electrolyte systems, both aqueous and non-aqueous, in order to improve mechanical strength and/or limit the rate of electrolyte absorption. In this regard, the first polymer in the polymer system or the absorbing or gel forming polymer, may be selected from the group of polymers including PVDF, polyurethane, polyethylene oxide, polyacrylonitrile, polymethylmethacrylate, polyacrylamide, polyvinyl acetate, polyvinylpyrrolidinone, polytetraethylene glycol diacrylate, copolymers of any of the foregoing, and combinations thereof.

The second component in the polymer blend, i.e., the nonabsorbing or inert component, may be selected from the group consisting of polyethylene, polypropylene, polytetrafluoroethylene, polystyrene, polyethyleneterephthalate, ethylene propylene diene monomer, nylon, and combinations thereof. In this regard, it should be noted that at least one polymer phase in the gel polymer electrolyte acts as a separator in the liquid electrolyte cell. The phase which acts as the separator is typically also the phase which provides mechanical stability to the entire electrolyte system. With respect to the relative amounts of each polymer in the blend, it is contemplated that the second or non-absorbing component may comprise between 10 and 40% of the polymer systems, and preferably between 15 and 25%.

Figure 3:
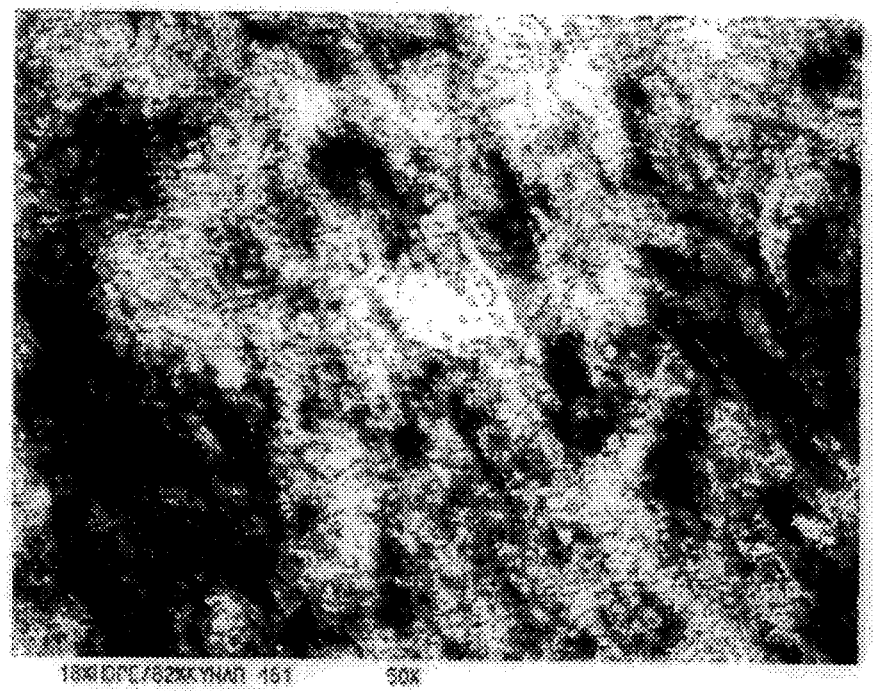
FIG. 3 is a photograph, taken with optical microscopy illustrating the structure of the polymer blend electrolyte system support structure in accordance with the instant invention.

Referring now to FIG. 3, there is illustrated a photograph of a polymer blend of PVDF and HDPE in accordance with the instant invention. The photograph is taken with optical microscopy in which the image is magnified 50×. As maybe appreciated from FIG. 3, two separate phases of polymers are present in the polymer blend of the instant invention. In FIG. 3, the electrolyte absorbing phase (PVDF) is identified by groupings or areas 80, 82, 84, 86, 88, while the non-absorbing polymer (HDPE) phase is identified by groupings or areas 90, 92, 94, 96, 98. It may thus be appreciated that the polymer system of the instant invention is a two-phase system as opposed to a copolymer such as that typically used in the prior art.

The invention may be further appreciated by the comparative examples provided hereinbelow.

EXAMPLES

Swelling analysis was conducted on a number of homopolymers, copolymers, and polymer blends in accordance with the instant invention. Each of the polymers was swelled in 100° C. 1M $PF_6$ in a 50%-50% solution of propylene carbonate/ethylene carbonate (PC/EC) solvent. The results are illustrated in the table below:

| Product | Time | Weight | Thickness | Comment |
|---|---|---|---|---|
| KYNAR 461 | 0 | 9.1 mg | 59 μm | |
| | 30 sec | 11.7 mg | 63 μm | |
| | 2 min | 40.1 mg | | collapsed |
| | 5 min | | | |
| KYNAR 761 | 0 | 11.3 mg | 67 μm | |
| | 30 sec | 17.0 mg | 86 μm | |
| | 2 min | 24.2 mg | 82 μm | folding |
| | 5 min | 23.4 mg | | folded |
| KYNAR 7201 | 0 | 11.5 mg | 66 μm | |
| | 30 sec | 19.4 mg | | pressed into mesh |
| | 2 min | 22.9 mg | | pressed into mesh |
| | 5 min | | | gooey-dissolving not embedded in mesh |
| 82:18 | 0 | 11.6 mg | 59 μm | |
| KYNAR 461: | 30 sec | 12.3 mg | 62 μm | Slight puckering |
| HDPE | 2 min | 18.0 mg | 65 μm | Slight puckering |
| | 5 min | 25.7 mg | 91 μm | Slight puckering |
| 75:25 | 0 | 9.5 mg | 61 μm | |
| KYNAR 461 | 30 sec | 12.4 mg | 80 μm | irregular surface |
| LDPE | 2 min | 16.1 mg | 87 μm | |
| | 5 min | 16.3 mg | 87 μm | |

EXAMPLE I

Polymer blends were produced using a bench top extruder heated to temperatures between 150° and 200° C. Polymer blend films were produced by hot pressing polymer blends between polished metal plates, at temperatures between 150° and 200° C. Homopolymer films of Kynar 461 and Kynar 761 as described above demonstrated significant uptake of liquid electrolyte active species (1M $LiPF_6$ in a 50%-50% solution of PC/EC), but generally poor mechanical properties and tended to tear easily. Kynar 461 in particular collapsed as the electrolyte active species content exceeded 75%. The PVDF/PTFE copolymer, Kynar 7201, likewise showed poor mechanical properties.

By blending the homopolymer (Kynar 461) with either LDPE or HDPE the electrolyte absorption was reduced; however, mechanical properties were substantially improved. For example, after five minutes the 75:25 Kynar 461/LDPE blend absorbed 42% of the electrolyte active species (again 1M $LiPF_6$ in a 50%—50% solution of PC/EC), while the 82:18 Kynar 461:HDPE blend absorbed 55% of the electrolyte active species. Impedance measurements were carried out for each sample, to determine the ionic conductivies of the films. For the 75:25 Kynar 461/LDPE blend, conductivity measured $1 \times 10^{-4}$ Siemens per centimeter (S/cm), while conductivity for the 82:18 Kynar 461:HDPE blend was $6 \times 10^{-4}$ S/cm. The conductivity of the 82:18 Kynar 461:HDPE blend is particularly suitable for application in lithium electrochemical cells, as is shown in Example II below.

EXAMPLE II

To demonstrate the suitability of a blended polymer electrolyte for application in lithium ion cells, a cell was constructed using a petroleum coke anode and a $LiCoO_2$ cathode. The polymer blend electrolyte system comprised the 82:18 Kynar 461:HDPE blend, soaked in 1M $LiPF_6$ in a 50%—50% solution of PC/EC. The electrodes were prepared by mixing and hot pressing powders with the following compositions:

anode: 81% petroleum coke, 19% Kynar 461 cathode: 73% $LiCoO_2$, 15% graphite, 12% Kynar 461.

A cell was formed by laminating the electrodes to the blended polymer. A copper mesh, current collector was used for the anode and an aluminum mesh current collector for the cathode. The liquid electrolyte active species was introduced by soaking in the solution at 100° C. The resulting electrode dimensions were 1.8 cm×2.0 cm×130 μm.

Figure 4:
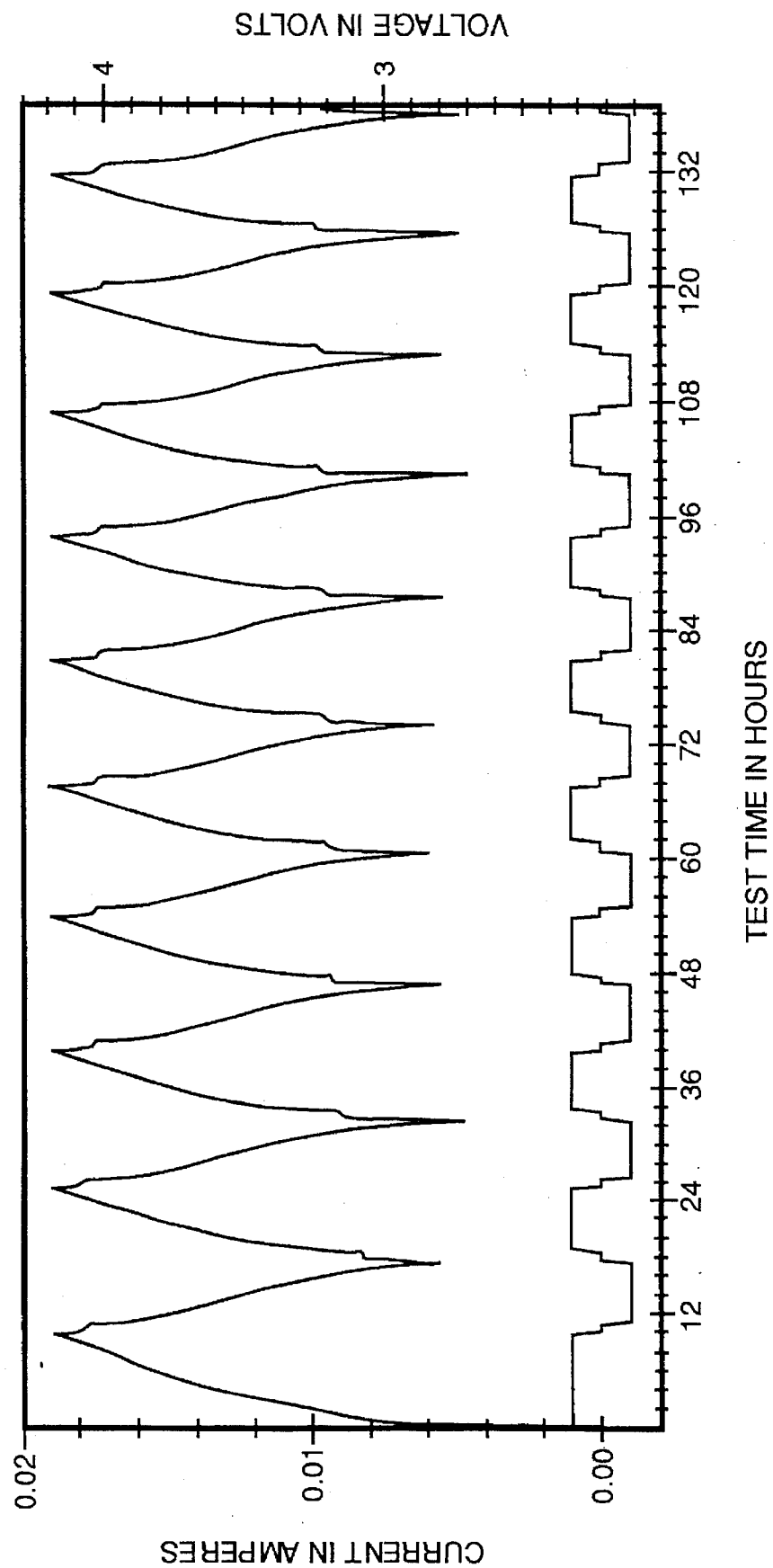
FIG. 4 is a chart illustrating a series of charge/discharge curves for an electrochemical cell incorporating a polymer blend support structure in accordance with the instant invention.

A cell so fabricated was cycled at 1.0 millistops (mA) between 4.2 and 2.7 volts, with one hour rests between each charge/discharge cycle. Referring now to FIG. 4, there is illustrated therein the charge/discharge profiles for the first ten cycles of the cell fabricated according to this example. As may be appreciated from a perusal of FIG. 4, the cell demonstrated good cell reversibility and overall good cell performance using the blended polymer electrode.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A polymer gel electrolyte system for use in an electrochemical cell having positive and negative electrodes, said polymer gel electrolyte system comprising:

a liquid electrolyte active species adapted to promote ion transport between said positive and said negative electrodes consisting of an alkali metal salt in a solvent selected from the group consisting of propylene carbonate, ethylene carbonate, diethyl carbonate, dimethylcarbonate, dipropylcarbonate, dimethylsulfoxide, acetonitrile, dimethoxyethane, tetrahydrofuran, and combinations thereof; and a two-phase polymer blend gel electrolyte support structure including at least a first phase including at least one polymer for absorbing said electrolyte active species and a second phase including at least one polymer for enhancing mechanical integrity of the polymer blend.

2. A gel electrolyte system as in claim 1, wherein said first phase polymer is selected from the group consisting of polyvinylidene fluoride (PVDF), polyurethane, polyethylene oxide, polyacrylonitrile, polymethylmethacrylate, polyacrylamide, polyvinyl acetate, polyvinylpyrrolidinone, polytetraethylene glycol diacrylate, copolymers of any of the foregoing, and combinations thereof.

3. A gel electrolyte system as in claim 1, wherein said second phase polymer is selected from the group consisting of polyethylene, polypropylene, polytetrafluoroethylene, polystyrene, polyethyleneterephthalate, ethylene propylene diene monomer, nylon, and combinations thereof.

4. A gel electrolyte system as in claim 1, wherein said alkali metal salt having the formula $M^+X^-$, where:

M+ is an alkaline metal cation selected from the group consisting of $Li^+$ and $Na^+$, $K^+$; and $X^-$ is a anion selected from the group consisting of $Cl^-$, $Br^-$, $I^-$, $ClO_4^-$, $BF_4^-$, $PF_6^-$, $AsF_6^-$, $SbF_6^-$, $CH_3CO_2^-$, $CF_3SO_3^-$, $(CF_3SO_2)_2N^-$, $(CF_3SO_2)_3C^-$, and combinations thereof.

5. A gel electrolyte system as in claim 1, wherein said electrolyte active species is $LiPF_6$, in a propylene carbonate/ethylene carbonate solvent and wherein said polymer blend includes a first phase consisting of polyvinylidene fluoride and a second phase consisting of polyethylene.

6. A gel electrolyte system as in claim 1, wherein the second phase polymer comprises between 10 and 40% of the two phase polymer support structure.

7. A gel electrolyte system as in claim 1, wherein the second phase polymer comprises between 15 and 25% of the two phase polymer support structure.

8. A polymer gel electrolyte system for use in an electrochemical cell having positive and negative electrodes, said polymer gel electrolyte system comprising:

a liquid electrolyte active species for promoting ion transport between said positive and said negative electrodes; and a two-phase polymer blend gel electrolyte support structure including at least a first polymer phase for absorbing said electrolyte active species, said first polymer phase being fabricated of one or more polymers selected from the group consisting of polyvinylidene fluoride (PVDF), polyurethane, polyethylene oxide, polyacrylonitrile, polymethylmethacrylate, polyacrylamide, polyvinyl acetate, polyvinylpyrrolidinone, polytetraethylene glycol diacrylate, copolymers of any of the foregoing, and combinations thereof and a second polymer phase for enhancing mechanical integrity of the polymer blend said second polymer phase fabricated of one or more polymers selected from the group consisting of polyethylene, polypropylene, polytetrafluoroethylene, polystyrene, polyethyleneterephthalate, ethylene propylene diene monomer, nylon, and combinations thereof.

9. A gel electrolyte system as in claim 8, wherein said liquid electrolyte active species further includes a solvent selected from the group consisting of propylene carbonate, ethylene carbonate, diethyl carbonate, dimethylcarbonate, dipropylcarbonate, dimethylsulfoxide, acetonitrile, dimethoxyethane, tetrahydrofuran, and combinations thereof.

10. A gel electrolyte system as in claim 8, wherein said liquid electrolyte active species includes an alkaline metal salt having the formula $M^+X^-$, where:

M+ is an alkali metal cation selected from the group consisting of $Li^+$ and $Na^+$, $K^+$; and $X^-$ is a anion selected from the group consisting of $Cl^-$, $Br^-$, $I^-$, $ClO_4^-$, $BF_4^-$, $PF_6^-$, $AsF_6^-$, $SbF_6^-$, $CH_3CO_2^-$, $CF_3SO_3^-$, $(CF_3SO_2)_2N^-$, $(CF_3SO_2)_3C^-$, and combinations thereof.

11. A gel electrolyte system as in claim 8, wherein said electrolyte active species is $LiPF_6$, in a propylene carbonate/ethylene carbonate solvent and wherein said polymer blend includes a first phase consisting of polyvinylidene fluoride and a second phase consisting of polyethylene.

12. A gel electrolyte system as in claim 8, wherein the second phase polymer comprises between 10 and 40% of the two phase polymer support structure.

13. A gel electrolyte system as in claim 8, wherein the second phase polymer comprises between 15 and 25% of the two phase polymer support structure.

14. An electrochemical cell comprising:

a positive electrode;

a negative electrode; and an electrolyte system comprising a liquid electrolyte active species, a solvent and a two-phase polymer blend gel electrolyte support structure consisting of a first polymer absorbing phase and a second polymer inert phase, wherein said liquid electrolyte active species is absorbed in said first polymer absorbing phase.

15. An electrochemical cell as in claim 14, wherein said first phase polymer is selected from the group consisting of polyvinylidene fluoride (PVDF), polyurethane, polyethylene oxide, polyacrylonitrile, polymethylmethacrylate, polyacrylamide, polyvinyl acetate, polyvinylpyrrolidinone, polytetraethylene glycol diacrylate, copolymers of any of the foregoing, and combinations thereof.

16. An electrochemical cell as in claim 14, wherein said second phase polymer is selected from the group consisting of polyethylene, polypropylene, polytetrafluoroethylene, polystyrene, polyethyleneterephthalate, ethylene propylene diene monomer, nylon, and combinations thereof.

17. An electrochemical cell as in claim 14, wherein said solvent selected from the group consisting of propylene carbonate, ethylene carbonate, diethylcarbonate, dimethylcarbonate, dipropylcarbonate, dimethylsulfoxide, acetonitrile, dimethoxyethane, tetrahydrofuran, and combinations thereof.

18. An electrochemical cell as in claim 14, wherein said electrolyte active species includes an alkaline metal salt having the formula $M^+X^-$, where:

M+ is an alkali metal cation selected from the group consisting of $Li^+$ and $Na^+$, $K^+$; and $X^-$ is a anion selected from the group consisting of $Cl^-$, $Br^-$, $I^-$, $ClO_4^-$, $BF_4^-$, $PF_6^-$, $AsF_6^-$, $SbF_6^-$, $CH_3CO_2^-$, $CF_3SO_3^-$, $(CF_3SO_2)_2N^-$, $(CF_3SO_2)_3C^-$, and combinations thereof.

19. An electrochemical cell as in claim 14, wherein said electrolyte active species is $LiPF_6$, in a propylene carbonate/ethylene carbonate solvent and wherein said polymer blend includes a first phase consisting of polyvinylidene fluoride and a second phase consisting of polyethylene.

* * * * *